United States Patent
Groitzsch et al.

(10) Patent No.: US 8,346,706 B2
(45) Date of Patent: Jan. 1, 2013

(54) METHOD AND DEVICE FOR IDENTIFYING TRAFFIC-RELEVANT INFORMATION

(75) Inventors: Stephan Groitzsch, Weinheim (DE); Matthias Schorn, Mühltal (DE); Thomas Fechner, Kressbrunn (DE); Ulrich Kressel, Ulm (DE)

(73) Assignees: Continental Teves AG & Co. oHG (DE); Automotive Distance Control Systems GmbH (DE); Contintental Engineering Service GmbH (DE)

( * ) Notice: Subject to any disclaimer, the term of this patent is extended or adjusted under 35 U.S.C. 154(b) by 309 days.

(21) Appl. No.: 12/601,062

(22) PCT Filed: May 16, 2008

(86) PCT No.: PCT/EP2008/056031
§ 371 (c)(1),
(2), (4) Date: May 4, 2010

(87) PCT Pub. No.: WO2008/145543
PCT Pub. Date: Dec. 4, 2008

(65) Prior Publication Data
US 2010/0241605 A1 Sep. 23, 2010

(30) Foreign Application Priority Data
May 25, 2007 (DE) .......................... 10 2007 024 695

(51) Int. Cl.
*G06N 5/02* (2006.01)
*G01C 21/26* (2006.01)
*G08G 1/0967* (2006.01)
(52) U.S. Cl. ......................................... 706/47; 701/200
(58) Field of Classification Search .................. None
See application file for complete search history.

(56) References Cited

U.S. PATENT DOCUMENTS

| | | | | |
|---|---|---|---|---|
| 5,493,633 A | * | 2/1996 | Obata | 706/57 |
| 5,671,140 A | * | 9/1997 | Bessacini et al. | 701/27 |
| 6,560,529 B1 | | 5/2003 | Janssen | |
| 6,801,638 B1 | | 10/2004 | Janssen et al. | |
| 7,058,206 B1 | * | 6/2006 | Janssen et al. | 382/104 |
| 7,460,951 B2 | * | 12/2008 | Altan et al. | 701/536 |
| 2001/0051850 A1 | | 12/2001 | Wietzke et al. | |
| 2003/0018928 A1 | * | 1/2003 | James et al. | 714/25 |
| 2004/0215377 A1 | | 10/2004 | Yun | |

(Continued)

FOREIGN PATENT DOCUMENTS

| | | |
|---|---|---|
| DE | 198 42 176 | 3/2000 |
| DE | 199 38 261 | 2/2001 |
| DE | 199 38 266 | 2/2001 |
| DE | 199 38 267 | 2/2001 |

(Continued)

*Primary Examiner* — Omar Fernandez Rivas
*Assistant Examiner* — Walter Hanchak
(74) *Attorney, Agent, or Firm* — RatnerPrestia (57) ABSTRACT

A device is arranged to carry out a method for identifying traffic-relevant information in a moving vehicle, wherein image data of a visual sensor and map data of a navigation system are each pre-evaluated for the identification and the results of the pre-evaluation are combined and interpreted. The image and map data is scanned for traffic-relevant information and compacted to relevant image and map data in a first and second scene interpretations, and the relevant image and map data is supplied to a rule engine and to a state machine for interpreting the image and map data. The rule engine evaluates the image and map data and transmits an action to be executed to the state machine which carries out a transition in its state space including pre-defined states and outputs information which is assigned to the state or to the transition.

18 Claims, 2 Drawing Sheets

U.S. PATENT DOCUMENTS

| | | | |
|---|---|---|---|
| 2006/0147089 A1* | 7/2006 | Han et al. | 382/104 |
| 2009/0268946 A1* | 10/2009 | Zhang et al. | 382/104 |
| 2010/0174479 A1* | 7/2010 | Golding et al. | 701/200 |
| 2010/0188864 A1* | 7/2010 | Raghunathan et al. | 362/466 |
| 2010/0191461 A1* | 7/2010 | Zeng | 701/208 |
| 2010/0208941 A1* | 8/2010 | Broaddus et al. | 382/103 |
| 2010/0253598 A1* | 10/2010 | Szczerba et al. | 345/7 |
| 2010/0292886 A1* | 11/2010 | Szczerba et al. | 701/29 |

FOREIGN PATENT DOCUMENTS

| | | |
|---|---|---|
| DE | 100 07 813 | 9/2001 |
| DE | 102 54 806 | 6/2004 |
| DE | 103 54 910 | 11/2004 |
| EP | 1 145 186 | 10/2001 |
| EP | 1 114 371 | 4/2003 |
| EP | 1 503 354 | 2/2005 |

* cited by examiner

METHOD AND DEVICE FOR IDENTIFYING TRAFFIC-RELEVANT INFORMATION

CROSS REFERENCE TO RELATED APPLICATIONS

This application is the U.S. National phase application of PCT International Application No. PCT/EP2008/056031, filed May 16, 2008, which claims priority to German Patent Application No. 10 2007 024 695.3, filed May 25, 2007, the contents of such applications being incorporated by reference herein.

BACKGROUND OF THE INVENTION

1. Field of the Invention

The invention refers to a method and to a device for identifying traffic-relevant information in a moving vehicle. Traffic-relevant information can in particular be traffic signs which, for example, indicate the maximum permissible speed. In addition to traffic signs as such, the invention in principle refers to all information which can be perceived visually and which instructs drivers to behave in a certain way. It is envisaged that the image data of a visual sensor, particularly an optical camera oriented in the direction of driving, and the map data of a navigation system are each pre-evaluated for said identification and the results of said pre-evaluation are combined and interpreted.

2. Description of the Related Art

Many developments in modern motor vehicles serve to make the driver aware of traffic-relevant information during driving to make driving safer on the whole. This includes in particular the indication of the currently valid maximum speed, which can be used merely as additional information for the driver, but also to generate danger warnings or to directly influence the vehicle's speed either by braking or accelerating.

Navigation systems have been known for quite a time, which in addition to the course and type of roads also include a valid speed limit. The quality of this speed limit included in the road maps as a fixed value largely depends, however, on how complete and up to date the digitalized maps are. Experience shows that it takes quite a time until new speed information is included in the digital map data if speed limits are changed. An even bigger problem is that digital road maps are often stored in navigation systems and users tend to update them relatively seldom as this involves considerable costs.

From a system point of view, it is even more difficult to detect temporary information, for example that provided by overhead sign bridges on motorways showing information and speed limits which are adapted to the prevailing traffic conditions or at road work sites. This varying information is particularly safety-relevant as the speed limits or other rules conveyed to the driver of a motor vehicle in this way are adapted to the prevailing traffic conditions or a current dangerous situation. This information cannot be detected, however, by the navigation systems described above.

In this respect, DE 199 38 261 A1 proposes to take into account temporary local conditions or individual impressions of the driver for a specific route by enabling temporary local conditions which can be entered automatically or manually, such as, for example, temporary speed limits, traffic jam warnings, or the like, to be placed as variable electronic route markers which are displayed and/or influence automatic operation of the motor vehicle when the route is driven again. There is the special problem, however, that this information is normally not available until the route is driven a second time and cannot be retrieved when the driver uses a route he/she does not know for the first time.

DE 199 38 267 A1 proposes a system for electronically identifying traffic signs, which are detected using a video camera, interpreted, and displayed within the vehicle. It is intended that the traffic signs which have been identified in this way are stored in a navigable electronic route map at their respective locations to improve the quality of the digital map and to enable traffic signs and navigated route data to be better correlated. In addition, DE 199 38 266 A1 proposes that a logical analysis is carried out if a traffic sign or one out of several traffic signs is not identified without doubt, in such a manner that other parameters of the prevailing traffic conditions and/or other traffic signs are also taken into account for the interpretation and the lowest possible speed limit is determined. This data is stored according to the respective location, the driver being allowed to make corrections.

DE 103 54 910 A1 discloses an autonomous vehicle which is provided with a self-steering navigation system and takes into account traffic signs placed at the side of the road. For this purpose, a camera records the traffic signs placed at the side of the motorway. An image processor analyses these images and determines the sign contents contained in the traffic signs. At the same time, map information concerning the motorway is stored in a navigation data base. An electronic steering unit with artificial intelligence now determines a current position of the self-moving motor vehicle and a road condition using the map information stored in the navigation data base and the sign contents read by the image processor. On the basis of the result determined in this way, a processor then controls a steering operation, a speed reduction/increase operation, and an operation related to the self-steering navigation function. This system is so far restricted to motorways, however, as the signs used there are limited and can be interpreted and identified much easier than on many other roads or streets, particularly within towns and cities where signing is often confusing.

EP 1 114 371 B1 describes a method and a device for identifying traffic signs and for navigation. If traffic signs are identified, traffic sign identification data is created and navigation data for locating the vehicle is provided and the traffic sign identification data and the navigation data is compared with each other and updated, if required. For this purpose, the data is supplied to a shared evaluation unit which determines a currently valid speed limit and generates control signals, if appropriate.

All systems described above have the drawback, however, that the data acquired during image data recognition is very extensive and the data processing described often cannot be done in real time, at least if all image data is evaluated.

For this reason, EP 1 145 186 B1 proposes a system having at least one map-based navigation system and a system for displaying the contents of traffic signs which have been recorded by a camera, wherein the system for traffic sign identification begins to work with increased power if map-based information indicates that the vehicle passes an area which is problematic in respect of traffic sign identification. For this purpose, a multiprocessor system for utilizing free data capacity throughout the motor vehicle is used. There is the problem, however, that the increased computing capacity is only available if the underlying map-based system already contains information that a situation might arise which could be difficult to evaluate in terms of image recognition.

SUMMARY OF THE INVENTION

An object of the present invention is to propose a solution for identifying traffic-relevant information which is based on image data of a visual sensor and map data of a navigation system, wherein the image data identified and the map data identified is analysed jointly, which is easy to adapt, and provides reliable information quickly. It is intended, for example, that the proposed system outputs information on the currently permissible maximum speed.

In the method for identifying traffic-relevant information of the type described in the opening paragraph, it is envisaged in particular that the image data is scanned for traffic-relevant information contained therein and compacted to the relevant image data in a first scene interpretation. The raw image data is processed in the pre-processing step 7 using image processing methods, such as edge detection, circle detection, tracking, classification with the aid of a trained classifier. The result is traffic signs which have been detected and assigned to a class. These image data is then compacted to relevant information in the scene interpretation 10 which forms a sub-block of the fusion module 2; an interpretation of the respective "scene" is carried out. The traffic-relevant information can be specific traffic signs, specifically speed-limiting traffic signs, road markings, obstacles, or the like which influence the driving behaviour and in particular the permissible or adequate maximum speed. Further, the map information is scanned for traffic-relevant information contained therein and compacted to relevant map information in a second scene interpretation. The traffic-relevant information of the map data can, for example, be information included in the map material on speed limits, no overtaking zones, or other up-to-date information of a telematics system, such as accidents, obstacles, road work sites, and the like. Information on topological conditions, such as, for example, area of a junction, roundabout, are also taken into account, as is information on the road section currently driven, such as road class, number of lanes, course of the road, within or out of build-up areas, driving on the right or left, country. If appropriate, the first and second scene interpretations can also exchange certain information to clarify initial doubts arising during the identification of traffic-relevant information in the image data or map data using the other available data in each case and to enable effective image compaction. The compacted image information can preferably be output as vectors in a defined data format.

The image data and map data which have been found to be relevant and compacted are then supplied to a rule engine and to a state machine for interpreting the image data and map data, wherein said rule engine evaluates the image data and the map data and transmits an action to be executed to the state machine. As a response to the action to be executed which is specified by the rule engine, the state machine carries out a transition between pre-defined states and outputs information assigned to said transition or to the (new) state achieved by means of the transition.

According to aspects of the invention, states are defined in the state machine which characterize properties of the moving motor vehicle and, if appropriate, of its surroundings. Such information contains, for example, the vehicle's speed, the response of safety-relevant sensors, such as the yaw rate sensor, acceleration or deceleration data, information on the type and condition of the road, status information concerning the visual sensor and/or the map material, in particular the age thereof, and/or the like. According to aspects of the invention, data from the sensor cluster of an ESC system is accessed. The combinations of vehicle and surroundings properties which are to be taken into account by the inventive system are pre-defined as states of the state space and characterize the current state of the moving vehicle within its surroundings—in particular detached from a rule-bound interpretation of the state based on the identification of traffic-relevant information.

The state of the moving vehicle can change with time. Such a change takes place, for example, when the vehicle leaves an area without speed limit and enters a speed-limited area which can be defined by means of a traffic sign, but also by a certain physical state of the road (dual lane road with fixed central crash barrier) or other conditions. As soon as the image data of the visual sensor and/or the map data of a navigation system detect the existence of such traffic-relevant information, the compacted information is evaluated in the rule engine and the result of this evaluation is transmitted to the state machine as an action to be executed. The state machine regards the action to be executed which has been specified by the rule engine as a transition in its state space during which a change is made from the initial state to a new or identical final state, as the case may be. Said transition or the newly achieved state can entail the output of certain information which is assigned to said state and depends on the type of transition, for example a warning to the driver that he/she has left a road section without speed limit and entered a speed-limited section at a speed of 80 km/h.

Depending on the implementation of the inventive system, this information which is output by the state machine can also be used to directly influence the motor vehicle, for example by exerting a braking effect, in addition to informing the driver, wherein the invention contemplates to specify a speed for a limiter, to specify a speed for Adaptive Cruise Control if the vehicle exceeds the speed indicated by the current traffic-relevant information specifying the maximum speed.

The inventive system has a modular structure which enables the functions of the inventive method and of the associated device to be changed and adapted easily. For example, new traffic signs or other information can be included into the scene interpretation and will be processed into compacted image or map data that can be used by the system without further adaptations in the rule engine or the state machine being required.

Further, the division of the computing unit in a rule engine, which enables contradictory situations in the input data to be clarified according to set rules, and a state machine, which defines the state of the motor vehicle and its surroundings which is essentially free from rule interpretation, enables sets of rules to be changed and adapted easily. It is possible, for example, to specify sets of rules for different countries and to load them into the system as modules at a later stage by updating the rule engine when a border is passed. As an alternative, just one rule engine can be used and certain rules be activated/deactivated in each country, and it is contemplated to exchange the rule engine completely in each country. Another option is a country-specific exchange of those rules in the rule engine which depend on country-specific requirements set out in the existing regulations governing road traffic. In this context, it is normally not necessary to make changes in the state machine as this defines the state of the vehicle which in principle is independent of rule interpretation.

The individual units or modules of the system can be as complex as desired without changing the simple modular structure of the entire system. This enables rapid real-time processing even if complex data is identified. In this way, little effort is required to adapt the system to potential other input sources which might be conceived in the future (for example vehicle data of third parties from telematics applications), which adaptation is also covered by the invention.

According to aspects of the invention, it is particularly advantageous that the contents of the relevant image and map data are interpreted in the rule engine according to specific sets of rules and the action specified by the rule engine parameterizes a behaviour which is prescribed by the identified rule. In this way, the part of the identification of traffic-relevant information requiring an evaluation of the contents of the image and/or map data detected is integrated in a logically independent block which can be adapted easily when a change is specified from outside, for example due to a change in performance of the input signal sources, a change of the Highway Code, or travel to another country with different traffic rules. For this purpose, it is advantageous to select a transparent, easy-to-adapt rule engine which enables easy adaptation to different country variants, among other things.

A representation of the rule engine which can be used with particular advantage according to aspects of the invention can be achieved by means of a matrix which can be evaluated using an algorithm. This is particularly suitable if the relevant image and map data and possibly further data, such as state information concerning the visual sensor or vehicle information, such as speed, ambient temperature, road condition (water, snow, ice), ESC data, or the like, is provided as vector information and transmitted to the rule engine and to the state machine in this form. A suitable matrix operation can then be used to derive a corresponding action from the identified image and/or map data in a mathematically simple way. Although the rule engine is stored in the form of two arrays, no "classical" matrix operations are used to evaluate the rules.

According to a particularly preferred embodiment, the state machine includes defined states which can be (or are allowed to be) assumed by the vehicle and/or its surroundings and the actions to be executed which are specified by the rule engine induce a transition from a defined state to another or back to the same defined state. The inventive definition of a state space comprising pre-selected, specified states creates a simple, modular system in which identified traffic-relevant information can be used to make a statement about the effects of a rule without major computing effort, both to define a new state of the vehicle and/or its surroundings and to output information on a display or to a rule engine of the vehicle.

For this purpose, it is particularly advantageous that each transition within the state machine is accompanied by an output of information, for example to a display instrument of the vehicle. In this way, a data output required by a transition to be executed is realized especially quickly.

Preferably, the state machine can also feed back its current state to the rule engine in order that the rule engine can also take into account the state of the vehicle and/or of the surroundings when interpreting the relevant image or map data. To achieve this, the relevant, compacted image data and the relevant, compacted map data can be supplied to the rule engine and to the state machine simultaneously so that the state machine feeds back the current state while evaluation of the rule in the rule engine is still going on, if appropriate. If desired for certain rules, the rule can, for example, also prescribe that current state information must be available in the rule engine before the rule is evaluated.

According to aspects of the invention, the state machine can be divided into a main state machine, which in particular represents the output behaviour of the state machine and, for example, processes information characterizing the state of the vehicle, and one or more surroundings state machines, which represent special conditions surrounding the vehicle, especially those changing with time, for example a stretch of the road where there are road work sites or variable message traffic signs. Said division of the state machine into several different state machines can also serve to implement parallel processing of several transitions required by an action to be executed which is specified by the rule engine.

According to a particularly preferred embodiment of the inventive method, the first and the second scene interpretations transmit a trigger signal to a trigger control during compaction to relevant image or map data, i.e. if traffic-relevant data exists and is identified, which trigger control then generates a total trigger signal for the arithmetic unit and the state machine. The total trigger signal causes the rule engine and the state machine to process the compacted or relevant image and map data available at their internal inputs. Upon reception of the total trigger signal, the rule engine determines the action to be executed and the state machine uses the available information to determine its state to be able to carry out a transition from its initial state to a new state once it receives the action to be executed. According to aspects of the invention, the rule engine can transmit an additional trigger signal to the state machine once it has finished its rule interpretation and at the same time as an action is output in order that the state machine carries out the transition without delay.

According to a simple embodiment, the trigger control can form an OR relation of the two trigger signals of the first and second scene interpretations to generate the total trigger signal.

A preferred variant of the trigger control envisages, however, that a counter, for example a distance counter which integrates the current vehicle speed, is activated if a first trigger signal from the first or the second scene interpretation is available and the total trigger signal is generated when a maximum counter value is reached, i.e. a maximum distance has been covered in the example, or the second trigger signal from the second or the first scene interpretation is available. In this way, asynchronies between different data can be compensated and the optimum point of time for data evaluation by the rule engine and the state machine be defined. Preferably, the rule engine and the state machine can receive the total trigger signal at the same time in order that the rule evaluation and the state identified in the state machine are based on the same data and the transition initiated by the action specified by the rule engine starts from the correct state of the state machine. Advantageously, another embodiment contemplates to generate the total trigger signal GT such that the total trigger signal GT is generated immediately if the trigger signal from pre-processing the image identification data is available while signal generation is delayed if only the trigger signal from pre-processing the map information is available.

Advantageously, relevant image and/or map data is selected in the first and/or second scene interpretation(s) using pre-specified criteria. For this purpose, relevant image and/or map data acquired at different times can be related to each other in time. The traffic signs or other information detected by the sensor at different times are/is thus placed in an overall context and in this way, for example, the point of time is determined at which the moving vehicle actually passes a traffic sign. Furthermore, knowledge concerning the camera and/or sensor position and the location of the traffic sign on the sensor area, for example the pixels of a CCD camera, enables a location-based selection of relevant images, wherein a correlation between the signals in time and place allows an even more exact interpretation of the scene. The correlation of data in place and time is suitable, for example, in the case of overhead sign bridges where it is difficult to determine which information is relevant to the vehicle's lane without a location-based detection. In the context of map data, it is also possible to generate a forecast of information which will probably be relevant soon using the current speed vector of the motor vehicle. In this context, the first and second scene interpretations suitably exchange image or map data, in particular those which have already been compacted, in order that information identified in one scene interpretation can also be used in the other scene interpretation.

According to aspects of the invention, the image data of the visual sensor can be reduced to a pre-selection of image data to be analysed and status information (camera status data) in a pre-processing step which is prior to scene interpretation to ensure in particular that the first and second scene interpretations are carried out at approximately the same speed. Said status information can, for example, include data concerning the quality of the camera (darkness, dirty windscreen or the like). In addition, this status information can be used by the rule engine to decide which data is more likely to be correct if the information contained in the image data deviates from that of the map data.

As mentioned above, the first and second scene interpretations can exchange information according to aspects of the invention to achieve an optimum compaction of the image and map data in each scene interpretation. In particular, traffic-relevant information identified in one of the scene interpretations should be transmitted without delay to the other scene interpretation.

In addition, it is particularly advantageous that raw vehicle data, for example vehicle sensor data, such as ESC, speed, or the like, and/or camera status data, for example brightness, image quality, or the like, is available throughout the process of identifying traffic-relevant information, in particular in the scene interpretations, the rule engine and/or the state machine.

In addition to the method described above, the invention also refers to a device for identifying traffic-relevant information in a moving vehicle having a connection to the system of a visual sensor for obtaining image data, a connection to a navigation system for obtaining map data, and a connection to a display instrument for displaying or processing the results of said identification. The device proposed according to aspects of the invention is designed in particular to carry out the method steps described above.

For this purpose, the device includes means for scene interpretation to compact the image data received from the visual sensor and the map data of the navigation system and to transmit the compacted image and map data to a computing unit including a rule engine and a state machine. Said means for scene interpretation can in particular be devices including an image processing and identification software in the case of image data processing. The means for scene interpretation applied to the map data of the navigation system can in particular be filter means which filter the map data for the desired traffic-relevant information.

The rule engine according to aspects of the invention is designed to evaluate the compacted image and map data received from the scene interpretations and to transmit actions to be executed to the state machine. The state machine according to aspects of the invention is designed to respond to the action to be executed by carrying out a transition within its state space comprising predefined states and to output information assigned to the new state or to said transition to the display instrument via the connection. The display instrument can be a visual display unit, an acoustic output device, or a control device which directly influences vehicle functions and, for example, initiates a braking action if the vehicle's speed exceeds a specified maximum speed. The invention also contemplates a linkage to other driver assistance systems, such as, for example, Cruise Control, Adaptive Cruise Control, or Limiter.

According to a particularly preferred embodiment, a trigger control (trigger) for generating a total trigger signal is connected downstream of the means for the first and second scene interpretations, which total trigger signal serves in particular as a start signal to the rule engine, and the state machine is active at all times in order to monitor the validity of traffic signs. If a signs seems not to be valid any more, the state machine can trigger the rule engine again. The state machine can, however, also be activated by means of a separate trigger signal of the rule engine, depending on the specific embodiment of the inventive concept.

According to an advantageous embodiment of the inventive device, the means for the first and second scene interpretations, the trigger, and the computing unit including the rule engine and the state machine can be combined to form a fusion module, wherein the connections between the individual units are realized via particularly fast internal interfaces which are less susceptible to failure than external interfaces. Preferably, the whole fusion module can be designed as a single device unit which includes a computing unit with memory, arithmetic unit and external connections and in which the method described above is implemented. Of course, it is also possible to divide the fusion module onto several, separate devices or to operate the fusion module directly on the control device of the camera.

The fusion module can also contain the means for pre-processing the image data, enabling the camera or the visual sensor and possibly other sensors to be directly connected to the fusion module. This can also be done by accessing corresponding information via a data bus. The entire data processing can then take place in the fusion module according to aspects of the invention, whose output interface is preferably connected to the data bus again and provides the traffic-relevant information in a standardized data format which can be evaluated by several other devices within the vehicle.

According to aspects of the invention, the modular structure of the proposed system (method and device) for identifying traffic-relevant information is of particular advantage when implementing such systems in a motor vehicle as the division of the interpretation of the combined image and map data in a rule engine and a state machine is simple and can be handled flexibly. The rules for interpretation can be integrated in a transparent rule engine which is easy to handle and can be adapted to possible changes easily. The rule engine contains the decision logic which is applied to the state machine with relatively low complexity to generate the corresponding outputs. Changes of the rule engine are easy to manage from a program technology point of view and can also be updated during usual inspections, if required. In addition, the use of state machines enables a system to be created which is very robust in terms of program technology, offers high process safety even in safety-relevant applications, and can surprisingly also be used to describe the states of a moving motor vehicle in the field of identifying traffic-relevant information, in particular traffic signs and speed limits, despite its static structure.

Further features, advantages and possible applications of the present invention will be set out in the following description of an exemplary embodiment and can be seen in the drawing. In these, all features described and/or represented visually form the subject-matter of the present invention, either alone or in any combination, independent of their combination in the claims or the dependencies of the latter.

DETAILED DESCRIPTION OF THE PREFERRED EMBODIMENTS

Figure 1:
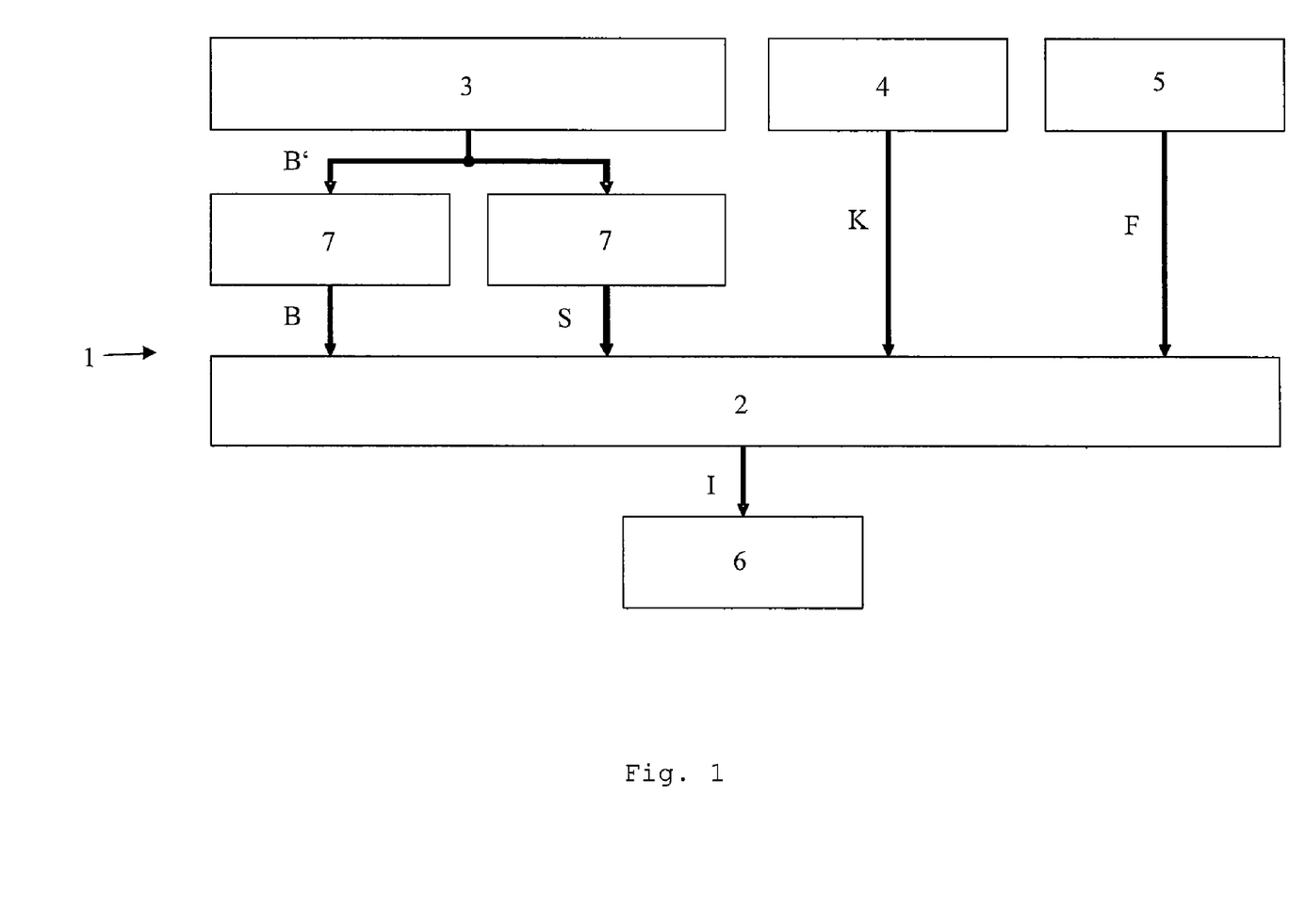
FIG. 1 is a diagram showing the integration of an inventive device for identifying traffic-relevant information in a motor vehicle.

The inventive device 1 for identifying traffic-relevant information, in particular traffic signs, which is illustrated diagrammatically in FIG. 1 includes a so called fusion module 2 having connections to a visual sensor 3 designed as a camera, a navigation system 4 and a vehicle information system 5. The connections serve to transmit image data B from the camera 3, map data K from the navigation system, and vehicle data F from the vehicle information system 5, which can, for example, be integrated in a vehicle CAN bus, to the fusion module 2 which uses this data to determine the desired traffic-relevant information I.

The traffic-relevant information I determined by the fusion module 2, for example the currently valid maximum speed, is output by the fusion module 2 to a display instrument 6. The display instrument 6 can be a visual display which serves to convey information to the driver. Furthermore, the display instrument can be a control interface to a vehicle control unit which, for example, automatically influences the vehicle's speed if a vehicle speed is detected which exceeds the current maximum speed. Generally speaking, the display instrument can be any device which continues to process the traffic-relevant information I which has been determined by the fusion module 2 according to the invention.

Before the image data of the camera 3 is supplied to the fusion module 2 as such, it is subjected to a pre-processing step 7 in which the raw image data B' received directly from the camera 3 is analysed using an image recognition algorithm to pre-select possibly traffic-relevant information I, for example using methods of classical image processing including edge/circle detection and subsequent classification and deleting irrelevant image areas. The processed images are then supplied to the fusion module 2 as actual image data B. The raw image data B' is also scanned for status information of the camera 3 in a parallel pre-processing step 7, which data is supplied to the fusion module 2 as additional camera status data S.

The image data B and the camera status data S is the intermediate result of a first evaluation step to which the raw camera data B' of the camera 3 has been subjected. This pre-evaluation can be integrated in the camera 3, but can just as well be a first method step carried out within the fusion module 2 as part of the application according to aspects of the invention.

Figure 2:
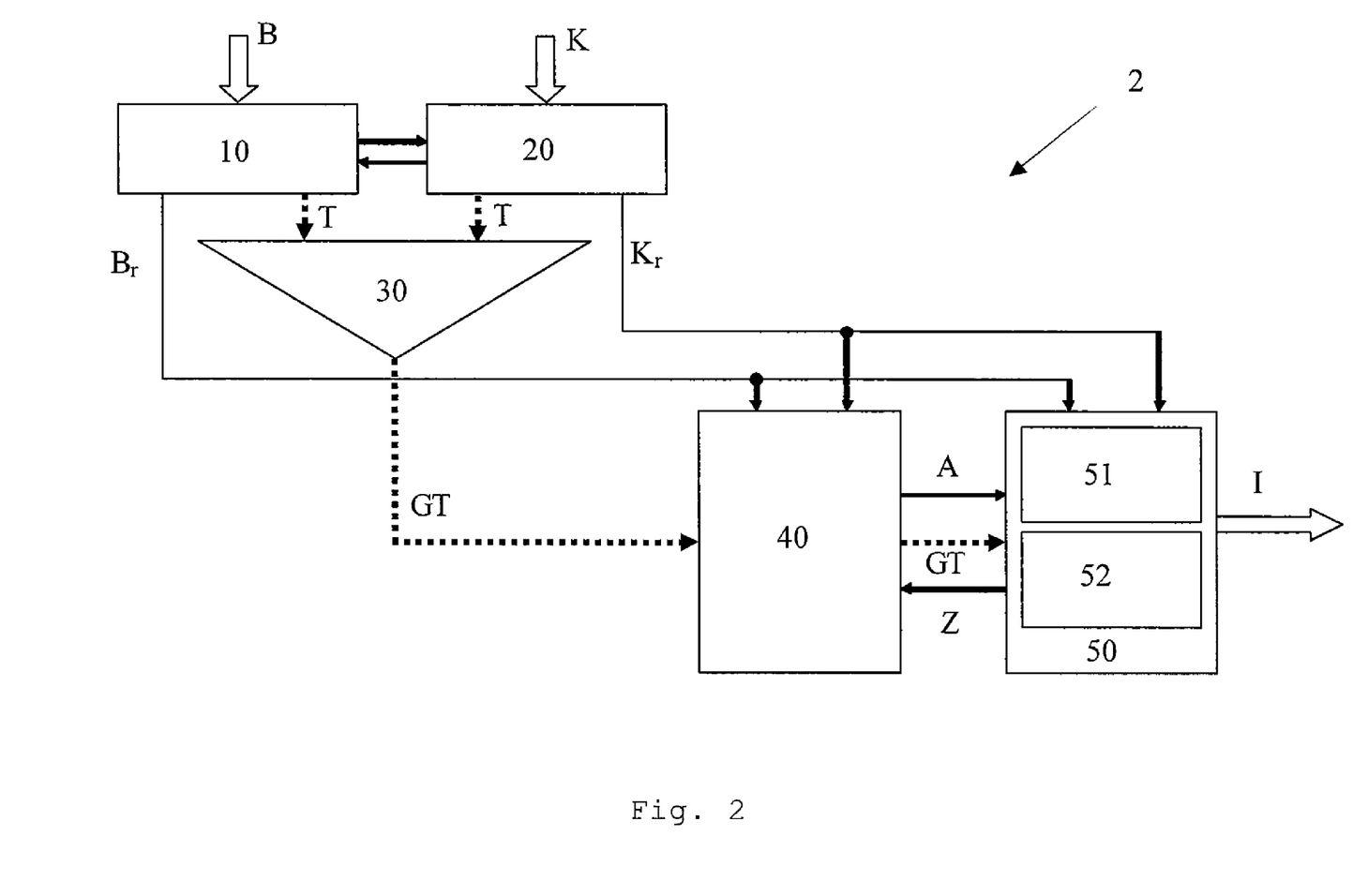
FIG. 2 shows in detail the structure of the device according to aspects of the invention.

Before the actual mode of operation of the fusion module 2 is explained in detail with reference to FIG. 2, some information on the technical field in general will be given to facilitate understanding of the invention.

An object of the present invention is to provide a solution to identify traffic-relevant information in a moving vehicle, which makes this information available in a particularly reliable manner. For this purpose, different available raw data is used which is supplied in particular by a visual sensor or a camera 3 and a navigation system 4 as image data B and camera data K.

Such systems are known per se. Both systems, however, a camera-based algorithm, for example as part of the proposed pre-processing step 7 for identifying traffic signs or other relevant information, and the digital road map of a navigation system 4 for identifying corresponding traffic signs in digital maps, have major drawbacks, if they are viewed independently.

If traffic signs are identified using a camera, the traffic signs cannot be identified reliably and correctly in all situations, for example depending on the ambient light conditions (light situation). In addition, there are uncertainties in the case of traffic signs which are damaged or partly covered, and further error sources for a non-reliable visual detection of traffic signs or the like are also conceivable.

The information provided by a digital road map also has several drawbacks. For example, the information contained in the digital road map as map data K can be obsolete. Furthermore, temporary speed regulations, for example on road work sites, and speed information conveyed by variable message traffic signs, which are increasingly used for intelligent traffic control, is not included in the digital data. The digital road map provides information on the topology of the road section driven (e.g. area of a junction, area of a roundabout, ...) and a turn-off-event (leaving of the most probable path), which is then processed in the fusion module.

The invention is intended to combine the advantages of the two individual systems in order to provide reliable information I concerning the currently permissible maximum speed or other traffic-relevant information. The system according to aspects of the invention should be easy to integrate in a vehicle and be able to be expanded later on. At the same time, images must be processed quickly to enable traffic-relevant information I to be acquired and evaluated in real time.

Such a system is provided by means of the fusion module 2 according to aspects of the invention, which will be explained in detail below.

The fusion module 2 is provided with the map data K, which is supplied as raw data, and the image data B, which has already been subjected to a pre-processing step 7, in each case via an external interface. In a preferred embodiment, the signals B are transmitted via an internal interface only. In addition, the camera status information or data S and the vehicle data F is input via further external interfaces (not shown) which can also be constituted, either wholly or in part, by a single vehicle data bus, for example a CAN bus. The information and data which has been input and which is not indicated in detail in FIG. 2 is available to all units shown.

The image data B is supplied to a first scene interpretation 10 and the map data K is supplied to a second scene interpretation 20, in which scene interpretations the decisive image and/or map data is selected using pre-specified criteria and compacted to relevant image data $B_r$ and map data $K_r$. The compacted data $B_r$ and $K_r$ and, if provided, the camera status information S and vehicle data F is preferably represented as data vectors within the fusion module 2. Transmission takes place via internal interfaces which enable particularly efficient data transmission. The external interfaces can serve to establish a direct connection to sensors belonging to the vehicle, for example the camera 3. Furthermore, the map data K of the digital road map and/or the vehicle data F can be transmitted via a CAN bus. Output of the traffic-relevant information I which has been identified to the display instrument 6 can also take place via a CAN bus.

The relevant image data $B_r$ and the relevant map data $K_r$ which is provided by the means for scene interpretation 10, 20 is supplied to a rule engine 40 and a state machine 50. The rule engine evaluates the image data $B_r$ and the map data $K_r$ and, as a response to this evaluation, transmits an action A to be executed to the state machine 50.

In the state machine 50, defined states Z are specified which represent a state of the moving vehicle and/or of the vehicle's immediate surroundings. These states are preferably defined using parameters which can essentially be objectively measured, in contrast to the information contained in the rule engine 40 which uses the measured data to interpret this measured data with a view to actions to be executed. Due to this particularly advantageous inventive division between the determination of actions to be executed in the rule engine 40, which interprets the map data and the image data according to the Highway Code, the state machine 50 provides a final description of the possible states of the vehicle and its surroundings. The various pre-defined states Z must therefore represent reality in its entirety.

This simplified representation makes it easy in particular to implement the fusion module 2 in moving vehicles and to compact and output the relevant information I contained in the selected data with little computing effort. To provide the rule engine 40 with a more comprehensive basis for decision making, the state machine 50 feeds back the current state Z which has been determined using the relevant image data $B_r$ and the relevant map date $K_r$ to the rule engine 40.

The actions A to be executed which are specified by the rule engine 40 are realized within the state machine 50 by means of transitions between an initial state and a target state, which initial and target states can be identical or different, depending on the type of transition. If a transition is carried out and/or a new state is reached, the desired relevant information I is output to the display instrument 6. The information can be output permanently as status information. As an alternative, the driver can be informed only in those instances when the speed limit changes or warned when he/she exceeds the currently permissible maximum speed.

To prevent continuous operation of the rule engine 40 and the state machine 50 and backlog of numerous program steps to be executed, which would result in a data and processing jam, a trigger control 30, also abbreviated as trigger, is provided which receives a trigger signal T from the scene interpretations 10, 20 of the image data B or the map data K when a scene interpretation 10, 20 has identified relevant information I in the data B, K supplied and compacted this to relevant image data $B_r$ or relevant map data $K_r$. The trigger 30 uses this trigger signal T to generate a total trigger signal GT which is supplied to the rule engine 40 and the state machine 50 and initiates their computing operations.

The individual components of the fusion module 2 will now be explained in detail once again.

The image data B, which preferably has already been preprocessed in the preprocessing step 7, is subjected to a scene interpretation 10 for said image data B which serves to obtain usable input data for the rule engine 40, which will be described in detail later on, and to compact the numerous individual image data to relevant information contained therein. For this purpose, the image data B, which is provided as pixel data in most cases, is converted to logical data information (relevant image data $B_r$) at the input of the scene interpretation 10 by translating the information identified in a camera image into relevant traffic information which is defined in the scene processing 10.

The images are processed in the pre-processing step 7. The image data B is classified traffic signs with additional information, such as, for example, position, size, degree of reliability of the evaluation, and the quality of image processing.

The scene interpretation 10 is, for example, arranged to identify specific traffic signs in order to determine the currently valid maximum speed.

In addition to interpreting the individual images, the successive individual images of the camera 3 must be ordered chronologically as a traffic sign typically can be seen in a number of individual images if the latter are recorded from a moving vehicle. For this purpose, the traffic signs which have been detected asynchronously are tracked internally to assign a traffic sign detected in several images of the camera 3 to traffic-relevant information. If a traffic sign which has been tracked in the scene interpretation 10 is no longer detected during a certain time, it can be assumed that the vehicle has passed this traffic sign and the traffic rules prescribed by this sign are now valid. In this case, the chronological sequence (tracking) of these scenes is finished and the features required to regard the scene as "completed" are fulfilled. The entire scene is then interpreted in the scene interpretation 10.

The scene interpretation 10 can, for example, be arranged to select data concerning the currently valid maximum speed. In this case, interpretation of the completed scene specifically means that the speed limit signs or end of speed limit signs are selected which are relevant to the vehicle in question and irrelevant signs are sorted out according to pre-specified criteria. In the case of overhead sign bridges which, for example, prescribe a specific speed for each lane on motorways, irrelevant signs can be sorted out using the lateral position of the signs, thus compacting the relevant traffic information I to the speed limit which is valid for the vehicle's own lane. If information provided by the digital road map indicates that the vehicle is in the area of a deceleration lane, corresponding signs which are only arranged on the side of the lane can be assigned to this lane. Once the scene interpretation is finished, the logical data which has been determined is made available to the rule engine 40 and to the state machine 50 as relevant image data $B_r$ via an internal interface.

Analogous to the foregoing, the scene interpretation 20 is intended to compact the map data K provided by the digital road map to relevant map data $K_r$. In principle, this is similar to the above scene compaction 10 for the camera-based traffic sign detection. For this purpose, current map information is combined with map information of a forecast to compact the relevant traffic information, which is made available to the rule engine 40 and to the state machine 50 once the scene interpretation is finished.

The relevant data $B_r$ and $K_r$ which is made available is preferably transmitted in the form of vectors, wherein each vector entry is assigned pre-defined information.

Furthermore, the scene interpretations 10, 20 each generate a trigger signal T when a scene interpretation 10, 20 detects a change of the scene compared to a previous stage which is relevant to the information to be analysed.

The trigger signals T are supplied to a trigger 30, also referred to as trigger control, which uses these trigger signals T to generate a total trigger signal GT which is supplied to the rule engine 40 and preferably also to the state machine 50. Upon reception of the total trigger signal GT, the rule engine 40 and the state machine 50 start interpreting or evaluating the relevant data $B_r$ and $K_r$ which has been made available, wherein the rule engine 40 interprets this data according to pre-specified rule information stored in a matrix and the state machine 50 uses this data to evaluate a current state of the vehicle and/or its surroundings.

In this way, computing time is saved in the fusion module 2, which is preferably structured as an arithmetic unit, as the rule engine 40 and the state machine 50 require computing time only when there is a change of traffic-relevant information I. As long as there is no such a change, more computing power is available to the scene interpretations 10, 20 in order to compact the relevant data contained in the input data as quickly as possible.

The trigger 30 can most simply be realized by OR relating the two individual trigger signals T. In the embodiment shown, the total trigger signal GT is, however, determined as follows. If the trigger signal T of one scene interpretation 10 or 20 is available, a counter is activated which, for example, is designed as a distance counter and as a time counter and continues counting for a certain distance, based on the current vehicle speed. This means, the counter integrates the current vehicle speed. If the second trigger signal T of the other scene interpretation 20 or 10 is available before a pre-defined maximum distance has been covered, the total trigger signal GT is activated immediately. If the second trigger signal T is not activated until the distance counter reaches its maximum distance, the total trigger signal GT is set when the counter finishes or the maximum distance has been reached. This indicates that only one of the two scene interpretations 10, 20 was able to identify traffic-relevant information.

Control by means of the trigger 30 can thus compensate asynchronities which often arise due to the fact that traffic signs and their locations in the digital map information often do not coincide.

When the total trigger signal GT is available, the relevant data $B_r$ and $K_r$ of the scene interpretations 10, 20 is used to evaluate a rule engine 40 which evaluates the information contained in the relevant data $B_r$ and $K_r$ according to the valid traffic rules. These actions A to be executed are converted in transitions in the state machine 50 which are used to change from a first to a second state in the state machine 50, which second state can also be identical to the first one. The rule engine 40 can be country-specific to take into account the different traffic rules in different countries. The proposed structure of the rule engine 40 also enables changes of traffic rules (for example due to changes in law) to be implemented flexibly.

The state machine 50 serves to represent various possible system states of the moving vehicle and/or of the vehicle's surroundings. For this purpose, the state machine 50 comprises a main state machine 51 which determines the output behaviour of the fusion module 2 and essentially specifies the information I which is to be output. The main state machine 51 can, for example, essentially represent the states assigned to the moving vehicle in respect of the current permissible maximum speed.

Special ambient conditions, such as, for example, a stretch of the road where there are road work sites or variable message traffic signs, can be represented using one or more surroundings state machines 52. In this way, the overall results of the identification of traffic-relevant information I can be improved and the necessary information be computed more quickly. Depending on the actions A to be executed which are specified by the rule engine 40, transitions between the states in the state machine 50 or in the main state machine 51 and/or the surroundings state machine 52 are carried out, wherein the output of traffic-relevant information I can be coupled to the transition or to the fact that a new state is reached. This means, information I assigned to the state is output in both cases.

The vehicle data F, which in particular comprises the current speed of the vehicle via telematics systems or information received via an interface camera system navigation system from other vehicles or beacons in the vehicle's surroundings, is included as additional information in the evaluation carried out by the fusion module 2 and can preferably also be provided in the form of vectors. In this way, limitation types are made adaptable and can be designed to be limiting, non-limiting or variable.

The invention therefore enables the two individual systems "camera-based traffic sign detection" and "digital road map" to be combined. The fusion module 2 or the method carried out therein enables information concerning traffic-relevant information and in particular the currently permissible maximum speed to be conveyed to the driver even in adverse ambient conditions and even if there are/is only temporary speed limits or information provided by variable message traffic signs.

The invention claimed is:

1. A method for identifying traffic-relevant information (I) in a moving vehicle comprising the steps of:
    pre-evaluating image data (B) of a visual sensor and map data (K) of a navigation system for said identification;
    combining and interpreting results of said pre-evaluation;
    scanning the image data (B) for traffic-relevant information (I) contained in the image data (B);
    compacting relevant image data ($B_r$) of the image data (B) in a first scene interpretation;
    scanning the map data (K) for traffic-relevant information (I) contained in the map data (K);
    compacting relevant map data ($K_r$) of the map data (K) in a second scene interpretation;
    supplying the relevant image data ($B_r$) and the relevant map data ($K_r$) to a rule engine and to a state machine for interpreting the image and map data;
    evaluating the image data ($B_r$) and the map data ($K_r$) in the rule engine;
    transmitting an action (A) to be executed to the state machine;
    carrying out a transition, in the state machine, within a state space of the state machine comprising pre-defined states (Z) as a response to the action (A) to be executed; and
    outputting information (I), in the state machine, which is assigned to a state (Z) or to said transition.

2. A method according to claim 1 further comprising the step of interpreting the contents of the relevant image and map data ($B_r$, $K_r$) in the rule engine according to specific sets of rules and the action (A) specified by the rule engine parameterizes a behaviour which is prescribed by a rule that has been identified.

3. A method according to claim 1, wherein a matrix is used to represent the rule engine, which matrix can be evaluated by means of an algorithm.

4. A method according to claim 1, the state machine includes defined states (Z) which can be assumed by the vehicle and/or its surroundings, wherein the action (A) to be executed, which is specified by the rule engine, induces a transition from a defined state to a another defined state or back to the defined state in the state machine.

5. A method according to claim 1, wherein a transition in the state machine is accompanied by an output of information (I).

6. A method according to claim 1, wherein the state machine feeds back its state (Z) to the rule engine.

7. A method according to claim 1, wherein the state machine is divided into a main state machine and one or more surroundings state machines.

8. A method according to claim 1, wherein the first and second scene interpretations transmit a trigger signal (T) to a trigger control during the compacting step to relevant image or map data ($B_r$, $K_r$), which trigger control generates a total trigger signal (GT) for the rule engine and the state machine.

9. A method according to claim 8, wherein the trigger control forms an 'OR' relation of the trigger signals (T) of the first and second scene interpretations to generate the total trigger signal (GT).

10. A method according to claim 9, wherein the 'OR' relation is a delayed 'OR' relation.

11. A method according to claim 9, wherein the trigger control activates a counter when a first trigger signal (T) from the first or the second scene interpretation is available and generates the total trigger signal (GT) either when a maximum counter value is reached or when a second trigger signal (T) is available.

12. A method according to claim 1 further comprising the step of selecting relevant image and/or map data ($B_r$, $K_r$) according to pre-specified criteria in the first and/or second scene interpretation(s).

13. A method according to claim 1 further comprising the step of reducing the image data (B') of the visual sensor to a pre-selection of image data (B) to be analysed and camera status data (S) in a pre-processing step which is prior to the scene interpretation.

14. A method according to claim 1 further comprising the step of exchanging information between the first and second scene interpretations.

15. A method according to claim 1, wherein vehicle data (F) and/or camera status data (S) is available during identification of traffic-relevant information (I).

16. A device for identifying traffic-relevant information (I) in a moving vehicle having a connection to a system of a visual sensor for receiving image data (B, B'), said device comprising:

a connection to a navigation system for receiving map data (K);

a connection to a display instrument for displaying or processing identification results, which device is configured to carry out the method according to claim 1; and means for scene interpretation to compact the image data (B) received from the visual sensor and the map data (K) of the navigation system and to transmit the compacted image and map data ($B_r$, $K_r$) to a computing unit including a rule engine and a state machine, wherein the rule engine is configured to evaluate the compacted image and map data ($B_r$, $K_r$) and to transmit an action (A) to be executed to the state machine, and wherein the state machine is configured to use the action (A) to be executed to carry out a transition within a state space of the state machine comprising pre-defined states (Z) and to output information (I) which is assigned to a state (Z) or to said transition to the display instrument via said connection.

17. A device according to claim 16, wherein a trigger control for generating a total trigger signal (GT) is connected downstream of the means for scene interpretation.

18. A device according to claim 16, wherein the means for scene interpretation, the trigger control, the computing unit including the rule engine and the state machine are combined to form a fusion module.

* * * * *